United States Patent [19]

Reid et al.

[11] Patent Number: 4,831,376
[45] Date of Patent: May 16, 1989

[54] OPTICAL ANALOG-TO-DIGITAL CONVERTER AND TRANSDUCER

[75] Inventors: Samuel K. Reid; Dan D. Chen, both of Blacksburg, Va.

[73] Assignee: Center for Innovative Technology, Herndon, Va.

[21] Appl. No.: 82,643

[22] Filed: Aug. 5, 1987

[51] Int. Cl.$^4$ .............................................. H03M 1/22
[52] U.S. Cl. ........................................ 341/13; 341/5; 341/6
[58] Field of Search ................ 340/347 P; 382/12, 58, 382/65; 341/1, 5, 6

[56] References Cited

U.S. PATENT DOCUMENTS

| | | | |
|---|---|---|---|
| 3,781,868 | 12/1973 | Huber | 340/347 P |
| 4,016,556 | 4/1977 | Fulenwider | 340/347 P |
| 4,388,613 | 6/1983 | Rush et al. | 340/347 P |
| 4,442,423 | 4/1984 | Urbanik | 340/347 P |

*Primary Examiner*—William M. Shoop, Jr.
*Assistant Examiner*—Richard K. Blum
*Attorney, Agent, or Firm*—Mason, Fenwick & Lawrence

[57] ABSTRACT

The present invention relates to an optical laser analog-to-digital (A/D) converter and the use of such a converter as a transducer. In a first embodiment of the invention, the converter consists of a source which produces a coherent beam of light that is passed through a lens system to produce a line or bar of light. The bar of light passes through a coded optical mask which is made of a thin transparent material with a binary or gray code printed thereon. The mask is mounted to an object whose movement is to be detected. The mask may also be configured in the form of a circle and mounted to a motor shaft to sense motor rotational displacement, RPM or velocity. As the mask moves, the imprinted pattern changes according to the coding on the mask. The portion of the light that passes through the mask strikes the target of a moving recording media. In another embodiment, the bar of light passes through a transparent media that changes in optical qualities to deflect the laser beam onto a target consisting of an optical coded mask over an array of photodiodes. In still another embodiment, a voltage is applied to a pair of plates between which is a transparent media whose optical dielectric constant changes with applied voltage. In yet another embodiment, the bar of light is deflected off the surface of a mechanical or electrical diaphragm.

8 Claims, 4 Drawing Sheets

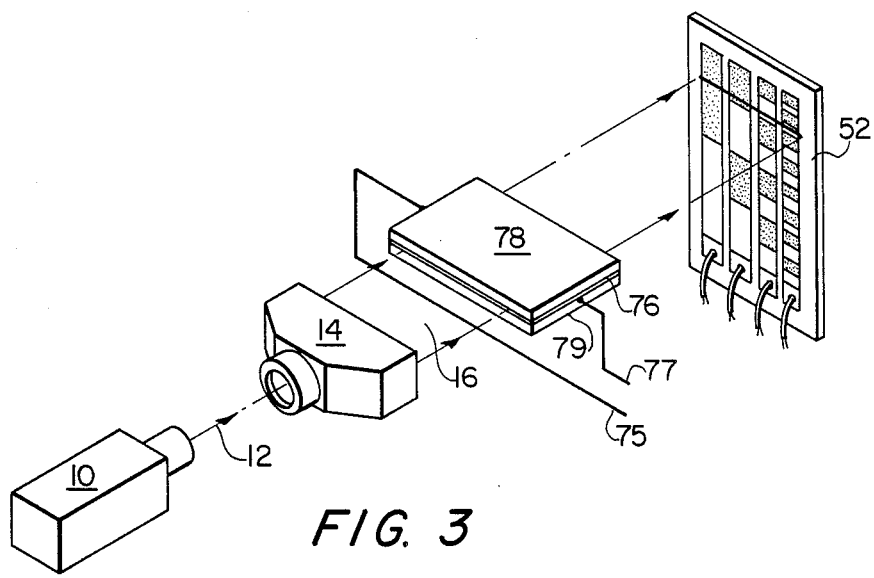
FIG. 3
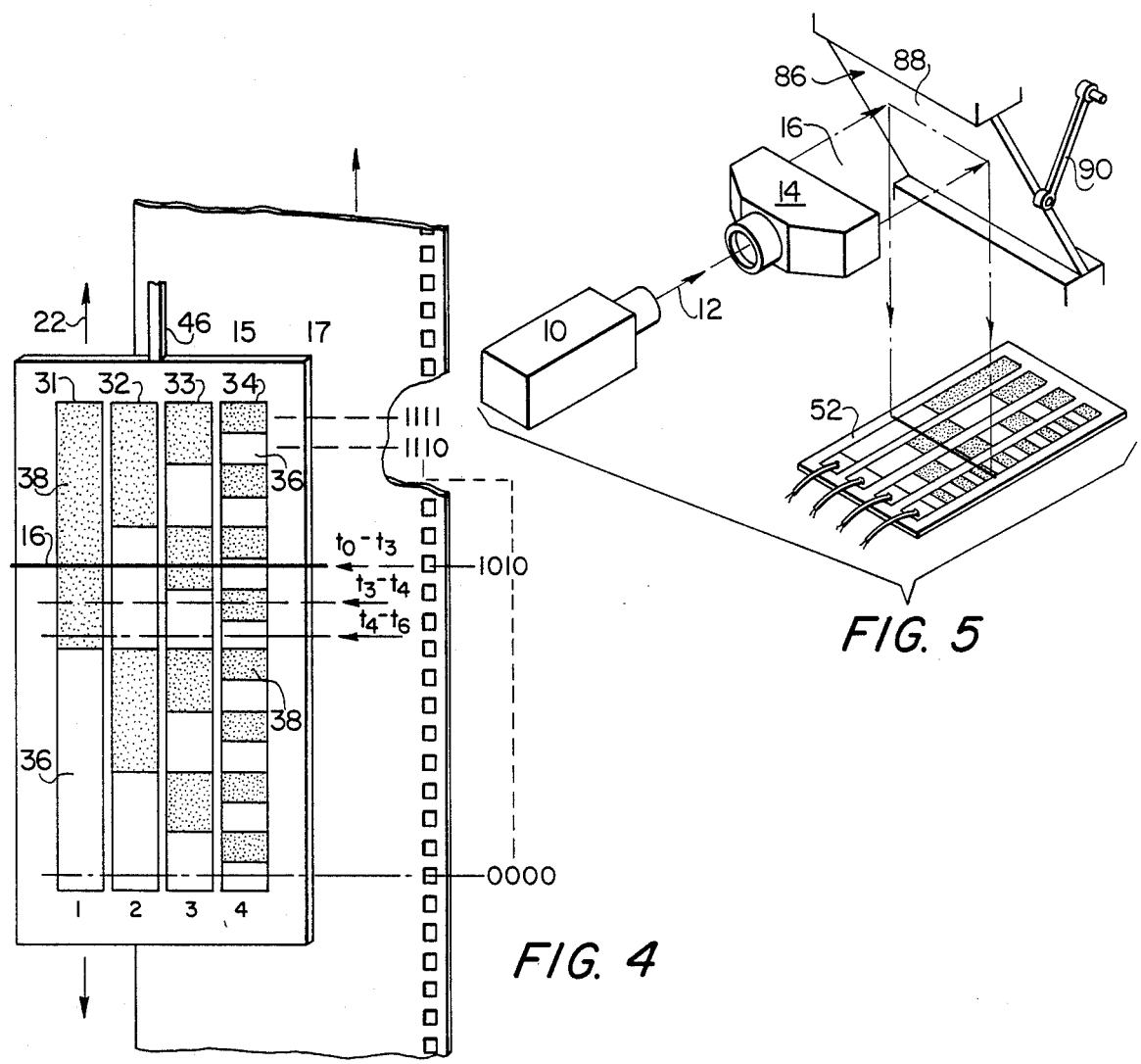
FIG. 4
FIG. 5

OPTICAL ANALOG-TO-DIGITAL CONVERTER AND TRANSDUCER

BACKGROUND OF THE INVENTION

The present invention relates to the use of optical means to achieve analog-to-digital (A/D) conversion and to the use of such an optical converter as a versatile transducer for measuring such parameters as movement, position, angular displacement, pressure and temperature.

FIELD OF THE INVENTION

In the prior art, there have been various electrical and electrooptical systems for converting an analog signal to a digital output. Traditionally, electrical A/D converter systems made on silicon substrates appear to be slower than electrooptical systems and they require more power. Continuing efforts are being made to develop higher speed A/D converters using laser and microelectronic devices. Many of the same concepts found in the electrooptical A/D converter are present in optical position sensors which are typically used to measure lengths or angles of movement, but may also be used for measuring such items as pressure or temperature. Additionally, optical position sensors find particular application in the field of fiber optics.

Generally, fiber optic position sensors comprise a light source transmitter, a light-sensing receiver, an encoder plate (located between the light transmitter and the receiver) for modulating light as a function of position, and a digital switching device triggered by a preset threshold lever of light output sensed at the receiver. The encoder plate comprises several rows of apertures in a plate which is attached to a movable body, whose position it is desired to monitor, so that the plate moves between the light transmitter and light receiver in response to displacements of the body. Each row of apertures forms an encoded information channel or band. Typically, the optical position sensor is designed so that the digital switching device produces several symmetrical digital output signals in response to the light output sensed at the receiver as a function of the varying position of the encoder plate. Such digital output signals may be easily processed by electronic circuitry which is relatively uncomplicated and inexpensive to construct. Conventionally, in order to produce the desired symmetrical digital output signals, each information channel on the encoder plate is constructed with apertures of equal length which are equally spaced from each other a distance equal to the length of an aperture and the threshold level of the digital switching device is preset at one-half of the designated (nominal) maximum amplitude of the light output at the receiver.

The symmetry of the digital output signals, and therefore, the accuracy of the fiber optic position sensor, depends on maintaining the light signal amplitude, sensed at the receiver, at the designated operating levels. However, the position sensor is often located in a hostile operating environment and variations in the amplitude of the light output sensed at the receiver may occur due to varying operating temperatures, degradation in the operating characteristics of the sensor due to aging of the equipment, breakage of optical fibers, and the accumulation of dirt and soil on the encoder plate. These operating conditions cause undesirable variations in the accuracy of the position measurements which are proportional to the amplitude of the light transmissions. See U.S. Pat. No. 4,442,423 (Urbanik) for an example of such an optical position sensor.

Another type of sensor is referred to as an absolute encoder and is principally used for reading lengths and angles. Typically, an absolute encoder includes a code plate which is displaced in a predetermined direction and has a plurality of tracks each of which have patterns, for example, binary codes representing positions. These patterns are read with a corresponding system of light sources, a mask and an array of photo sensors. However, these systems possess some shortcomings. For example, many light sources and photo sensors are required and the device, as a whole, thus becomes complex in structure. Improvement in resolution is hard to obtain due to the restrictions imposed by the pattern precision, sensitivity of the photo sensors, etc.

See U.S. Pat. No. 4,384,204 (Hamaki et al) for an example of an absolute encoder of the type just described. The encoder disclosed in the Hamaki et al patent is characterized by the provision of fine reading tracks on the code plate. As in other prior art devices, the photo sensors used in the encoder are arranged in a linear array, one next to the other, to form a line sensor.

U.S. Pat. No. 4,185,274 (Giallorenzi) is directed to a high speed electrooptical A/D converter which is used to convert an analog electrical signal to a digital output. The system uses an optical wave guide and optical elements in combination with a ribbon fiber, coded, light detector array that converts the detected light to digital electrical outputs. The system is characterized by the provision of a coded detector array which is formed by six ribbon-type optic fibers placed adjacent to each other in a vertical stack. Certain portions of the fibers are rendered opaque so as not to pass light. A line of light from a laser is then trained on the detector array with certain portions of the light being guided to a linear array of photodetectors formed into a line sensor.

U.S. Pat. No. 3,590,261 (Smoot) relates to an optical electric transducer capable of producing both analog and digital outputs. The transducer is used in the context of an aneroid can-type pressure transducer. Typically, such devices include two chambers, one of which communicates with the atmosphere or ambient pressure conditions and the other of which communicates with the system pressure conditions which are to be measured. This transducer which acts as a variable resistance device includes a diaphram which extends between the two chambers. A strain gauge is bonded to the diaphram and serves to detect changes in the pressure condition. A stretching of the strain gauge produces a change of resistance proportional to the elongation of the gauge. An electrical output can be transmitted to a remote exciting signal source and amplifier system for read-out of the pressure conditions at the remote source.

In the Smoot patent, the transducer operates on the principle that a motion producing force, such as that produced by a movable element, can be used to shift a gate or shutter mechanism between a radiation emitter and a radiation sensitive device, such as a photo cell. The amount of shutter movement responsive to movement of the movable element controls the amount of light incident on the radiation-sensitive element in direct proportion to the displacement of the movable element.

U.S. Pat. Nos. 4,382,250 (Radnelli); 4,423,958 (Schmitt) and 4,518,859 (Hoshika) are examples of optical encoding systems for measuring movement and angular rotation.

There is thus a need for an optical A/D converter which is relatively simple in construction, noise-free in operation while at the same time being highly reliable and adaptable for use as a transducer in measuring quantities such as movement, position, angular displacement, pressure and temperature, to name a few. The present invention is directed toward filling that need.

SUMMARY OF THE INVENTION

The present invention relates to an optical laser analog-to-digital (A/D) converter as a primary element in a system for translating an electrical or mechanical analog signal into a pure digital signal. The present invention also relates to the use of such a converter in a multitude of differing configurations to create transducers for recording movement, position, angular displacement, pressure and temperature, to name a few.

In a first embodiment of the subject invention, the apparatus constituting the optical A/D converter consists of a light source which produces a coherent beam of visible or infrared light. This beam is passed through a lens system in order to produce a line source or bar-shaped source of light. As an alternative, the line source may be produced by rapidly moving the beam of light back-and-forth at a high rate of speed along a path corresponding to the line source The bar of light passes through a coded optical mask which is made of a thin transparent material with a binary or gray code printed thereon. The coding is produced through the use of opaque coding paint or other printing means such as black anodized evaporated aluminum.

The thickness of the bar of light is set by the thickness of one word of digital information printed on the optical mask. The width or length of the bar of light corresponds to the length or width of the digital word printed on the optical mask. The mask is physically mounted to an object whose movement or position is to be detected. The object may be a diaphram which moves back and forth due to sound pressure waves or may move in response to gaseous or liquid pressure. The object may simply be attached to some type of mechanical positioner to sense mechanical position. The mask may also be configured in the form of a circle and mounted to a motor shaft to sense motor rotation a displacement, RPM or velocity. In all examples, as the mask changes position, the imprinted transparent-/opaque pattern changes according to the coding imprinted on the optical mask. The portion of the light bar that passes through the mask strikes the target of a recording media which may be a movie film, an optical disc, a CCD disc, etc.

In an alternative embodiment of the subject invention, the bar of light passes through a transparent media. As the media changes in density or optical qualities, the laser beam is deflected accordingly onto a target consisting of an optical coded mask over an array of integrated circuit photodiodes. The mask is constructed so as to create an array of photodiodes in a coded pattern such as either a binary or gray scale form. As the deflected beam moves up and down the target, the binary or gray coded mask illuminates different sets of the diffused photodiodes according to the digital code desired at electrical outputs of the integrated circuit. In an alteration to this embodiment, a magnetic field may scan the unknown material and thus create a Faraday-digital detection instrument.

In still another embodiment of the subject invention, a voltage is applied to a pair of capacitive plates between which is a transparent media whose optical dielectric constant changes with applied voltage thus deflecting the light source up and down onto the target receiver composed of the coded photodiodes. As in the embodiment just described, the bar of light passes through the target optical mask and the receiving photodiodes are illuminated according to the desired digital code.

In yet another embodiment of the subject invention, the bar source of light is deflected off a mirrored diaphram onto the fixed target optical mask with the array of integrated circuit photodiodes. The diaphram may move in response to an applied pressure and, in an optional arrangement, may be mechanically connected to a device that changes position. In a modification to the embodiment just described, the diaphram is replaced by a capacitive electrostatic diaphram or a piezoelectric material, both of which alter their shape in response to an applied electrical current and thus deflect the bar light onto the fixed target optical mask.

In an alteration to the first embodiment of the subject invention, a mirrored diaphram of the mechanical or electrical type is placed to receive the bar of light from the lens system and to reflect that bar of light onto the fixed optical mask. The movement of the diaphram in the manner described hereinbefore, causes the light to pass through the transparent mask and then onto an optical recording medium such as a motion picture film, an optical disc or other similar device.

It is thus a primary object of the present invention to provide a device for achieving analog-to-digital conversion through the use of optical means.

It is another object of the present invention to employ an optical A/D converter for recording on a light-sensitive media movement or change in position of an object.

It is still an object of the present invention to provide an optical analog-to-digital converter employing a coded photodetector array for participation in the conversion.

It is yet an object of the present invention to provide an optical A/D converter that is simple in construction and relatively noise-free.

Further objects and advantages of the invention will be apparent from the following detailed description of the preferred embodiments which are shown in the accompanying drawings.

BRIEF DESCRIPTION OF THE DRAWINGS

FIG. 3 shows a modification to the embodiment of FIG. 2 where the transparent media has been replaced by a capacitive arrangement for deflecting the bar of light.

FIG. 4 is a plan view partially in schematic of the optically encoded mask for the embodiment of FIG. 1.

FIG. 5 is still another embodiment of the subject invention which makes use of a reflective diaphram for directing the light beam onto the target.

DETAILED DESCRIPTION OF THE PREFERRED EMBODIMENTS

Figure 1:
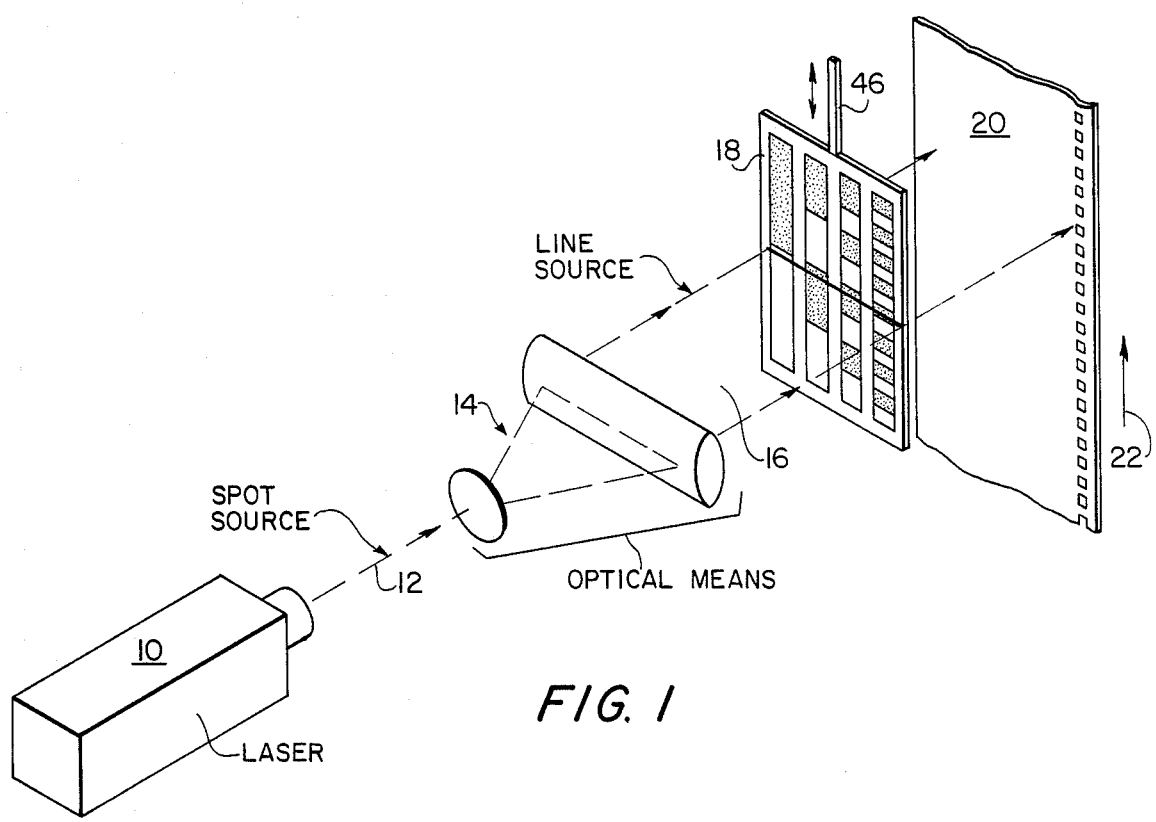
FIG. 1 is a schematic diagram showing a first embodiment of the subject invention in the context of an A/D converter responding to mechanical movement and for permanently recording the conversion.

As shown in FIG. 1, a first embodiment of the inventive analog-to-digital converter comprises a laser 10 which produces a very narrow, intense beam of coherent visible or infrared light 12. This beam of light is passed through a lens system 14 that terminates in a cylindrical lens producing a line source or bar shaped source of light 16. The bar of light passes through an optically encoded mask 18 and onto a recording media 20 which in a preferred embodiment is a moving strip of film advancing in the direction indicated by arrow 22. It is also contemplated that the recording media may include an optical disc, a compact disc, etc.

FIG. 4 shows in greater detail an embodiment of the transparent optical mask 18. The mask basically comprises an elongated transparent sheet of material such as glass or plastic. The mask contains a forward planar surface 15 and a rearward planar surface 17. Disposed on planar surface 15 are a series of elongated bands 31 through 34 arranged so that their longitudinal axes are parallel to each other with adjacent bands being spaced from each other. Each of the bands includes at least one transparent area 36 and at least one non-transparent area 38. The non-transparent areas are created through the use of opaque coding paint or other printing means such as black anodized evaporated aluminum.

In a preferred embodiment, the coded bands or strips 31 through 34 are divided into transparent and non-transparent sections in order to create an exposure pattern on the recording medium representative of a binary coded number. In order to create a coded pattern for reproducing the binary equivalent of decimal numbers 0 to 15, strip 31 is divided in half with the upper portion being opaque and the bottom portion being transparent. Strip 32 is divided in quarters with alternate opaque and transparent portions. Finally, strip 33 is divided into eight parts and strip 34 is divided into 16 parts of alternating opaque and transparent portions. In this way, all the decimal numbers from 0 to 15 are represented in a 4-bit binary word.

It is to be understood that any number of coded bands may be used to implement any type of binary word, for example, an 8-bit or a 16-bit word. The number of coded bands is directly related to the desired accuracy of the inventive sensor. As oriented in FIG. 4, the bottom of bands 31 through 34 define an area where the bar of light is able to pass through the mask and onto the recording media. By convention, an exposed area of the recording media is considered to represent a zero. However, this is a arbitary assignment and the exposed area could also represent a logic "1". Thus, the bands at the bottom of the mask define the binary number 0000, whereas the same bands at the top of the mask define the binary number 1111. In FIG. 4, the bar of light 16 is passing through a portion of strips 31 through 34 to define the binary number 1010.

In order to properly move the bar in an up-and-down direction in line with the longitudinally axes of the various bands, the top of the bar is connected through a mechanical linkage 46 to a moving object (not shown). In addition, the coded strips 31 through 34 are disposed on the transparent mask so that the light passing through the bands strikes the surface of the recording media.

Figure 8:
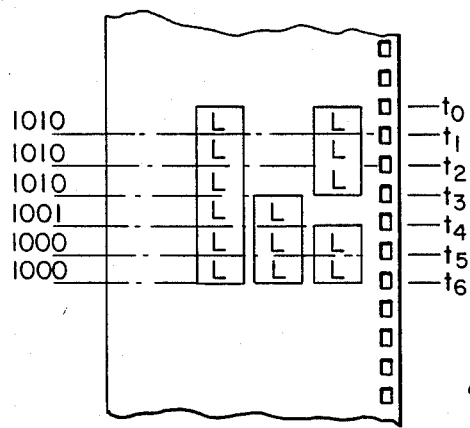
FIG. 8 is a plan view partially in schematic of the transparent mask used in the embodiment of FIG. 1.

FIGS. 4 and 8 show the way in which a pattern is recorded on the recording media during the movement of the mask during discreet time intervals $t_0$ through $t_6$. During time intervals $t_0$ through $t_3$, the bar of light strikes the mask as shown in FIG. 4, thus creating the pattern shown in FIG. 8, where L denotes an area of the media struck of light. This pattern represents the binary number 1010 for the three discreet time intervals $t_0$ to $t_1$, $t_1$ to $t_2$ and $t_2$ to $t_3$. From time interval $t_3$ until $t_4$, the target is raised upward so that the bar of light 16 now passes through selected portions of the coded bands to define the binary number 1101. During the time intervals $t_4$ through $t_6$, the coded target is moved further in an upward direction so that the bar of light passes through the coded portion to define binary number 1000. As can be appreciated, the recording media will produce the digital representations as either continuous strips, if the laser emits a constant beam, or discreet elements, if the laser is operated to produce short bursts or pulses of light. The size and duration of the discreet elements is directly related to the advancing motion of the film and the frequency of the pulses from the laser.

Figure 2:
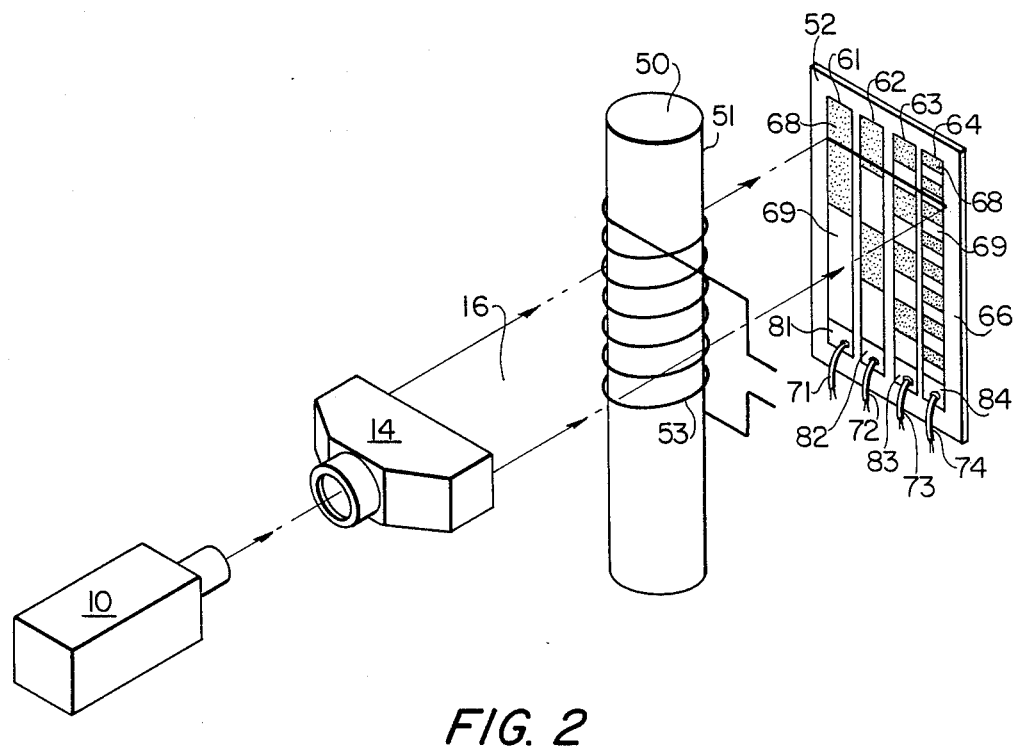
FIG. 2 is an alternative embodiment of the subject invention employing a transparent media and a photodiode encoded array for developing a digital signal.

FIG. 2 shows yet another embodiment of the subject invention where like elements contain like reference numbers. Basically, the transparent mask 18 and the photosensitive recording media 20 of the embodiment of FIG. 1 have been replaced by a transparent media 50 in a transparent cylindrical housing 51 and an optical target 52 implemented in an integrated circuit consisting of a coded mask positioned over an array of photodiodes. The transparent media is preferably a material whose optical properties change through the application of magnetic energy supplied by the passage of current through wire coil 53. For example, might include iron filings suspended in a liquid such as water application of current through wire coil 53 causes the particles to bunch up near the coil thus causing the laser to be diffracted as it passes through the media.

Figure 10:
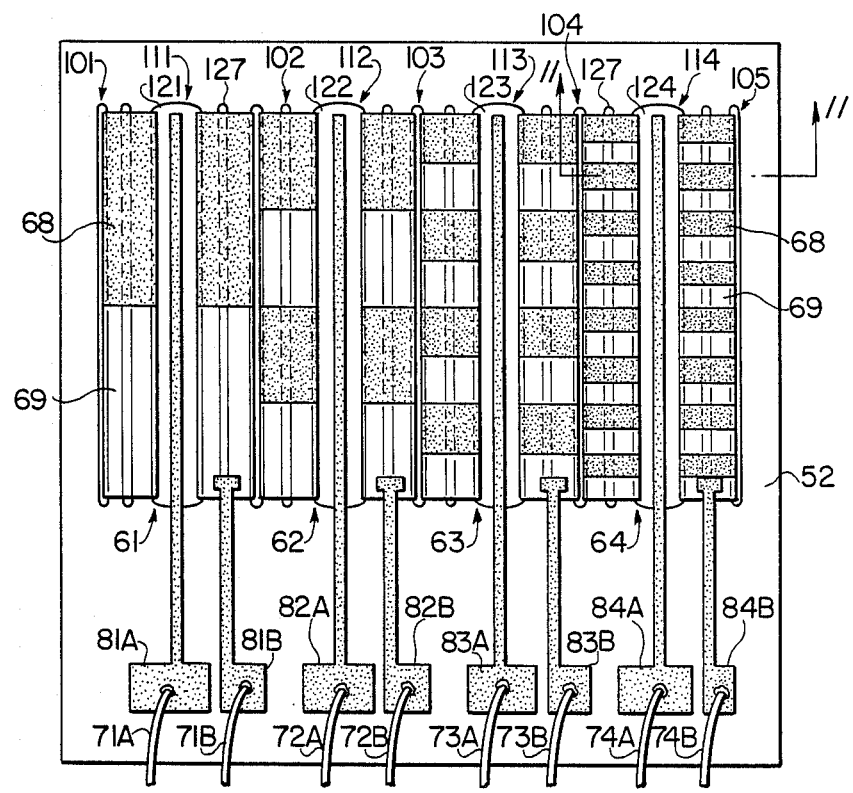
FIG. 10 is a schematic diagram showing the components of a preferred embodiment of the integrated circuit photodiode array shown in FIG. 2.
Figure 11:
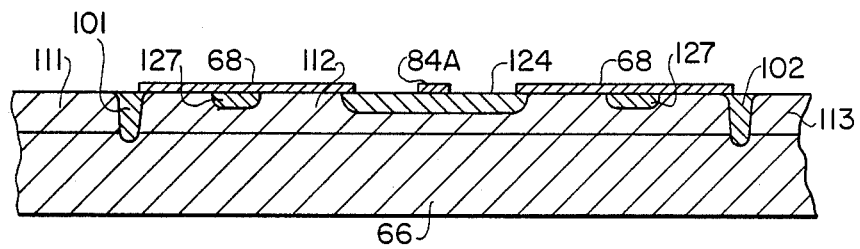
FIG. 11 is a view taken along lines 11—11 of FIG. 10.

FIGS. 2, 10 and 11 show an example of a 4-bit word implemented in a silicon photodiode diffused array.

The array basically comprises an elongated planar substrate of silicon material 66. Deposited on the substrate are a series of elongated photodiode cells 61 through 64. These elongated cells are deposited on the silicon substrate so that the cells have their longitudinal axes essentially parallel to each other with each of the strips being spaced from each other. As shown in FIG. 2, each of the strips terminates at its lower portion in bonding areas 81 through 84 to each of which is secured by pairs of wires 71 through 74. Each of the strips contains at least one non-transparent area 68 and at least one exposed area 69 which acts to reveal the underlying photodetector. Both the bonding area and the non-transparent area of each strip is made from aluminum or another conductive metallization mask. In much the same way as the mask of FIG. 8, the detector strips in a preferred embodiment are divided in accordance with a predetermined code to produce the binary equivalent of decimal numbers 0 through 15 depending on which portion of the array as struck by the bar of light 16. By way of example, the bottom portion of the photodetector array when struck by the light bar 16 produces an electrical output on lines 71 through 74 representative of the binary number 0000. In like manner, the top of the array when struck by the light bar 16 produces electrical signals on lines 71 through 74 representative of the binary number 1111. As positioned in FIG. 2, the light bar is striking the diode array to produce on lines 71 through 74 the binary number 1100. The mask may also be coded in gray code binary, logarithmic gray and binary code as seen in CODEC.

FIGS. 10 and 11 illustrate in greater detail an embodiment of the optical target 52 implemented as an integrated circuit. Preferably, the embodiment of the integrated circuit photodiode array shown in FIGS. 10 and 11 is manufactured using the standard seven mask diode isolation process. At the heart of the photodiode array is a p doped wafer constituting the p substrate 66. A thin n− doped epitaxial layer is grown on top of the p substrate.

Next, for the embodiment shown in FIG. 10, five elongated p isolation deep diffusion areas are created within the p substrate and thin epitaxial layer. Defined between the isolation areas are four elongated, adjacent n− islands 111 through 114. Created in the top of the epitaxial layer, midway between adjacent p isolation areas, are several elongated p based diffusions 121 through 124.

As shown in FIG. 11, an n+ emitter-type diffusion 127 is made alongside each p base diffusion to improve the DC quality of the photodiode and to also speed its response time. As an alternative, an n+ buried layer step (not shown) could be used for the same purpose.

In conventional integrated circuit manufacturing, a layer of silicon dioxide glass is grown over the whole wafer on top of the epitaxial layer. After this, a thin layer of conductive metal, typically aluminum, is vacuum deposited after windows have been etched in the glass layer, where electrical connections are desired. The aluminum metal is then etched away leaving the electrical connection pattern going to the bonding pads (see, for example, bonding pads 81A through 84A and 81B through 84B).

In the embodiment of the subject invention as shown in FIGS. 10 and 11, the integrated circuit not only includes the normal etching and creation of the anode bonding pads 81A through 84A and diode bonding pads 81B through 84B along with the electrical connectors 161 through 164 and 171 through 174 going to the integrated circuit elements but also includes the etching of additional patterns to provide the opaque areas 68 over the photodiodes 69 in accordance with the desired binary code. In the embodiment shown in FIG. 10, each of the bonding pads is made up of two parts. Using pad 81 as exemplary, the first part of the pad constitutes an anode 81A. The second part of the pad constitutes a cathode 81B. Together these two elements are identified schematically in FIG. 2 as item 81. In the same way, a wire lead 71A and 71B is respectively connected to anode pad 81A and cathode pad 81B. In like manner, wire leads 71A and 71B are schematically shown in FIG. 2 as wire pair 71.

FIG. 3, shows a modification to the embodiment of FIG. 2. In particular, the transparent medium assembly is replaced by a transparent media 76 whose optical dielectric constant charges with voltage applied through leads 75 and 77 through opposed capacitive plates 78 and 79. The charge in the dielectric constant of the media 76 disposed between plates 78 and 79 deflects the light source 16 up and down onto the target optical mask 52.

FIG. 5 shows a modification to the embodiment of FIG. 2. In particular, the transparent medium assembly is replaced by a mirrored diaphragm 86 having reflective surface 88 for guiding the bar of light 16 onto the surface of the diode array 52. The diaphragm means is responsive to such forces as pressure. The diaphragm could also be an electromechanical diaphram such as a voice coil as shown in FIG. 9.

Figure 9:
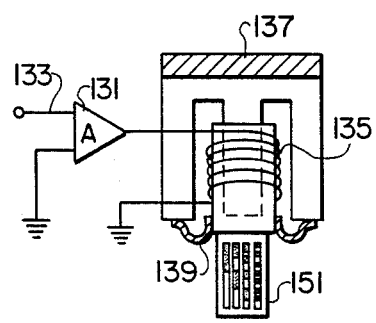
FIG. 9 is a schematic diagram of an embodiment of the subject invention incorporated into an electromechanical voice coil.

In the embodiment shown in FIG. 9, an amplifier 131 receives a signal from a microphone or other low level analog input on line 133. The output of the amplifier is fed into voice coil 135 which is grounded. The voice coil is surrounded by, and receives, a conventional magnet structure 137 customarily used in speakers.

The voice coil is flexibly suspended by a conventional spider structure 139 so that the voice coil may move up and down as oriented in FIG. 9. Secured to the bottom of the voice coil is a coded mask 151. The mask may take the form of either the transparent mask 18 for use in an arrangement similar to that shown in FIG. 1 or the integrated circuit mask 52 for use in an arrangement adopting the principle as shown in FIG. 5. Optionally, the diaphram may be connected to a mechanical element through the position attachment link 90. Movement of the mechanical element causes a corresponding movement of the diaphram.

Figure 6:
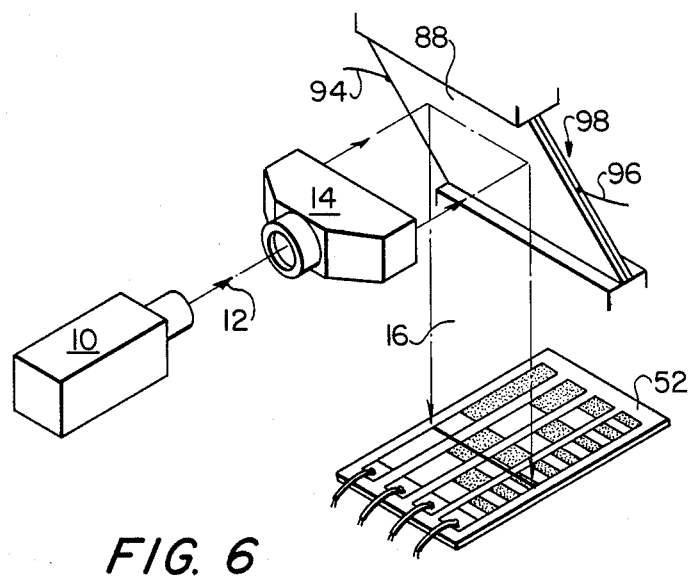
FIG. 6 is a modification to the embodiment of FIG. 5 where the mechanical diaphram has been replaced by an electrical diaphram.

FIG. 6 shows yet a further modification to the embodiment of FIG. 5 where the mechanical diaphragm 86 has been replaced by an electrical diaphragm 98 having mirrored surface 88. This diaphragm may be fashioned as part of a capacitive electrostatic device or as part of a piezoelectric device. Both the capacitive and piezoelectric devices are of conventional design and operate to convert an electrical signal to a mechanical vibration that distorts the mirrored surface to reflect the light 16 onto the optical target. In each case, the shape of the deflective surface is altered through the application of a current through electrical leads 94 and 96.

Figure 7:
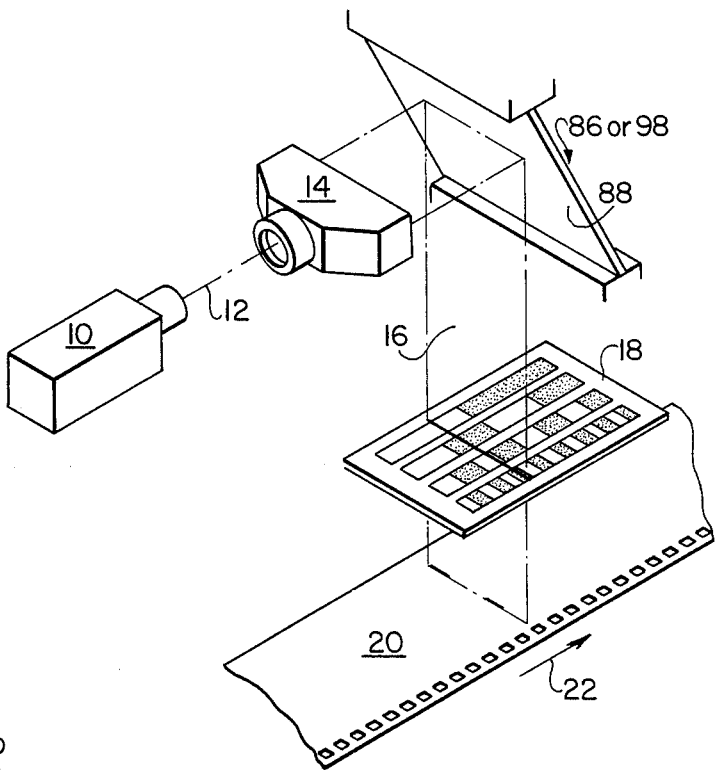
FIG. 7 is a modification to the embodiment of FIG. 1 where a movable diaphram has been introduced in order to deflect the bar of light onto the transparent target.

FIG. 7 shows an alteration to the embodiment of FIG. 1 where the diaphrams of the type found in the embodiments of FIG. 5 and FIG. 6 are incorporated into the path of the light bar 16 so that it deflects the light onto the optical mask 18 and then onto the recording media 20. In this case, the movement of the optical media 20 in the direction 22 is coordinated and timed to produce discreet images on the recording media as the light passes through the optical mask 18.

Figure 12:
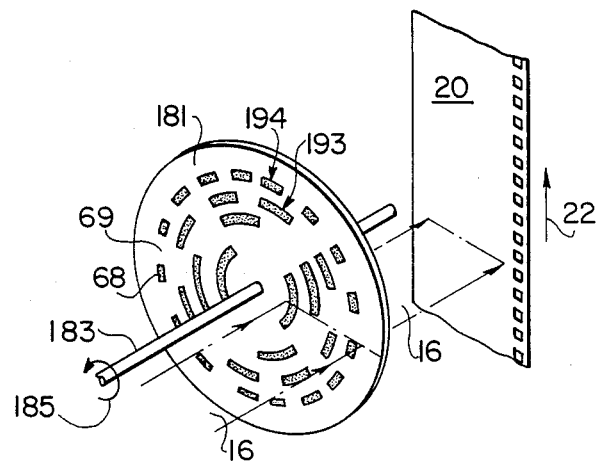
FIG. 12 is a schematic diagram showing an alteration to the embodiment of FIG. 1.

Finally, FIG. 12 shows an alteration to the embodiment of FIG. 1 where the transparent sheet 18 has been replaced by a transparent disk 181 secured to rotating shaft 183. The disk rotates in the direction noted by arrow 185. As can be seen, the binary pattern of sheet 18 has been converted into a series of concentric bands 191 through 194 defined on disk 181. By passing the line source 16 through the concentric bands and onto the recording media 20, it is possible to monitor and record the angular rotation and displacement of the disk and the shaft.

From the above, it is apparent that many modifications and variations of the present invention are possible in light of the above teachings. It is therefore to be understood, that, within the scope of the appended claims, the invention may be practiced otherwise then as specifically described.

What is claimed is:

1. An optical position sensor for monitoring displacements of a movable body, said sensor comprising:
   a laser means for producing a coherent beam of light as a single point source;
   an optical means for converting said point source to a coherent beam in the form of a bar of light of constant width, thickness and intensity;
   an optical mask having a plurality of opaque and transparent areas arranged in accordance with predetermined code, said opaque areas for blocking the passage of said bar of light and said transparent areas for passing said bar of light, said mask being movable to cause said light to pass through different portions of said mask;
   a movable light-sensitive recording media for receiving said bar of light after passing through said optical mask; and
   means for continuously moving said recording media in a predetermined direction for recording said light as it passes through said transparent areas onto said recording media.

2. The position sensor of claim 1, wherein said optical mask forms part of a rotating disk and said recording media records the angular movements of said disk.

3. An optical position sensor for monitoring displacements of a movable body, said sensor comprising:
   laser means for producing a coherent beam of light as a single point source;
   optical means for converting said point source to a coherent beam in the form of a bar of light of constant width, thickness and intensity;
   an optical mask having a plurality of opaque and transparent areas arranged in accordance with a predetermined code into a plurality of coded bands, said opaque areas for blocking the passage of said bar of light and said transparent areas for passing said bar of light, said mask being fixedly mounted;
   a movable light-sensitive recording media for receiving said bar of light after passing through said optical mask;
   a means for directing said bar of light onto said optical mask so that said bar of light is cast across said bands and aligned to pass through the transparent areas of said band and onto said recording media;
   a deflecting means for shifting the position of said light as it is cast across said band; and
   means for continuously moving said recording media in a predetermined direction for recording said light as it passes through said transparent areas onto said recording media.

4. An optical position sensor for monitoring displacements of a movable body, said sensor comprising:
   a light source producing a coherent beam of light;
   a transparent sheet having a planar surface;
   a plurality of elongated ends defined on said planar surface so that the longitudinal axes of said bands are essentially parallel and adjacent to each other, each of said bands being divided into a number of transparent and non-transparent coding areas in accordance with a predetermined coded pattern;
   a means for fixedly securing said transparent sheet to the movable object so that the movement of said sheet is substantially confined in two directions along the longitudinal axes of said bands;
   a lens means for converting said beam of light into a bar of light, said bar of light having a predetermined width, thickness, said width of said beam being wide enough to span across said bands, said thickness of said beam being no greater than the length of the shortest coding area as measured along the longitudinal axes of said bands;
   a light-sensitive recording media moving in a predetermined direction;
   a means for directing said bar of light onto said transparent sheet so that said bar of light is cast across said bands and aligned to pass through the transparent areas of said bands and onto said recording media; and
   a means for controlling the duration of said coherent beam of light.

5. The position sensor of claim 4, wherein said predetermined code is a binary code.

6. The position sensor of claim 4, wherein said predetermined code is a gray code.

7. A sound recording apparatus comprising:
   a speaker magnet;
   a voice coil movably mounted to said magnet;
   means for moving said voice coil in response to a sound signal;
   a light source producing a single coherent beam of light;
   a transparent sheet having a planar surface;
   a plurality of elongated bands defined on said planar surface so that the longitudinal axes of said bands are essentially parallel and adjacent to each other, each of said bands being divided into a number transparent and non-transparent coding areas in accordance with a predetermined coded pattern;
   a means for fixedly securing said transparent sheet to said voice coil so that the movement of said sheet is substantially confined to two directions along the longitudinal axes of said bands and in the directions of movement of said voice coil;
   a lens means for converting said beam of light into a bar of light, said bar of light having a predeterined width and thickness, said width of said beam being wide enough to span across said bands, said thickness of said beam being no greater than the length of the shortest coding area as measured along the longitudinal axes of said bands;
   a light-sensitive recording media moving in a predetermined direction;
   a means for directing said bar of light onto said transparent sheet so that said bar of light is cast across said bands and aligned to pass through the transparent areas of said bands and onto said recording media; and
   a means for controlling the duration of said coherent beam of light.

8. The position sensor of claim 7, wherein said predetermined code is a binary code.

* * * * *